No. 866,396.          PATENTED SEPT. 17, 1907.
H. M. SMITH.
BREEDING CAGE.
APPLICATION FILED APR. 4, 1907.

4 SHEETS—SHEET 1.

WITNESSES:
Wm H Payne
J. H. Gardner

INVENTOR:
Harvey M. Smith,
BY
E. T. Silvius,
ATTORNEY.

No. 866,396. PATENTED SEPT. 17, 1907.
H. M. SMITH.
BREEDING CAGE.
APPLICATION FILED APR. 4, 1907.
4 SHEETS—SHEET 2.
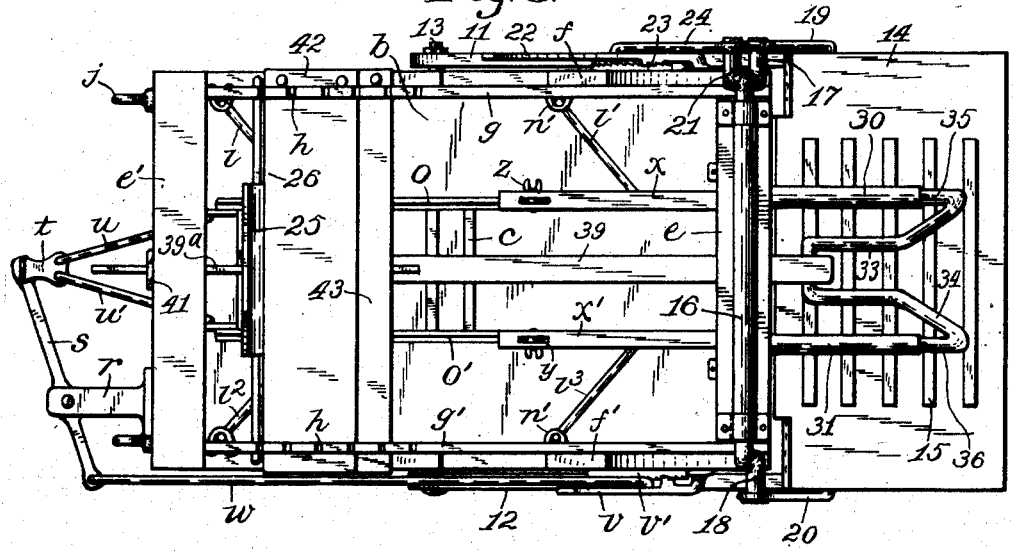
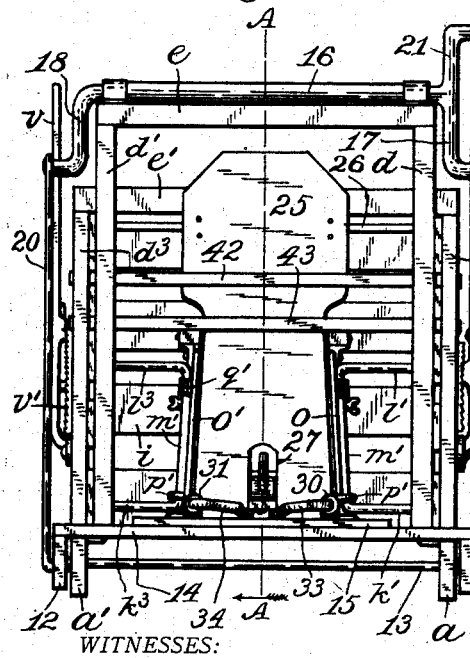
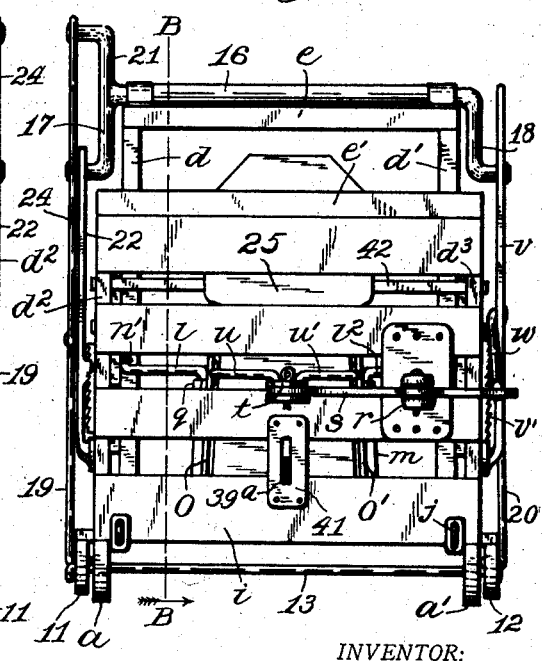
WITNESSES:
Wm H Payne.
J. H. Gardner.
INVENTOR:
Harvey M. Smith,
BY
E. T. Silvius,
ATTORNEY.

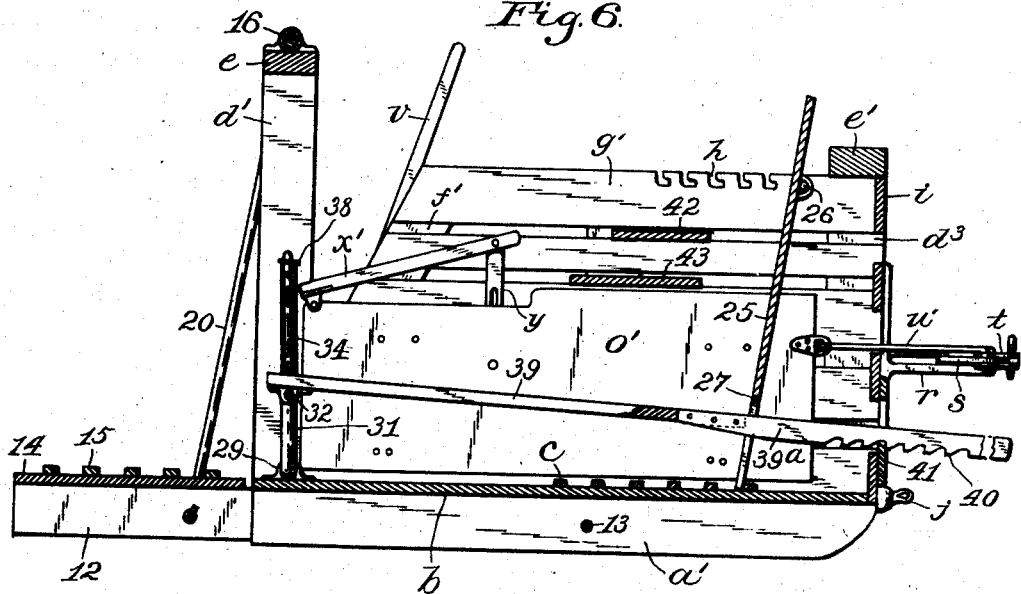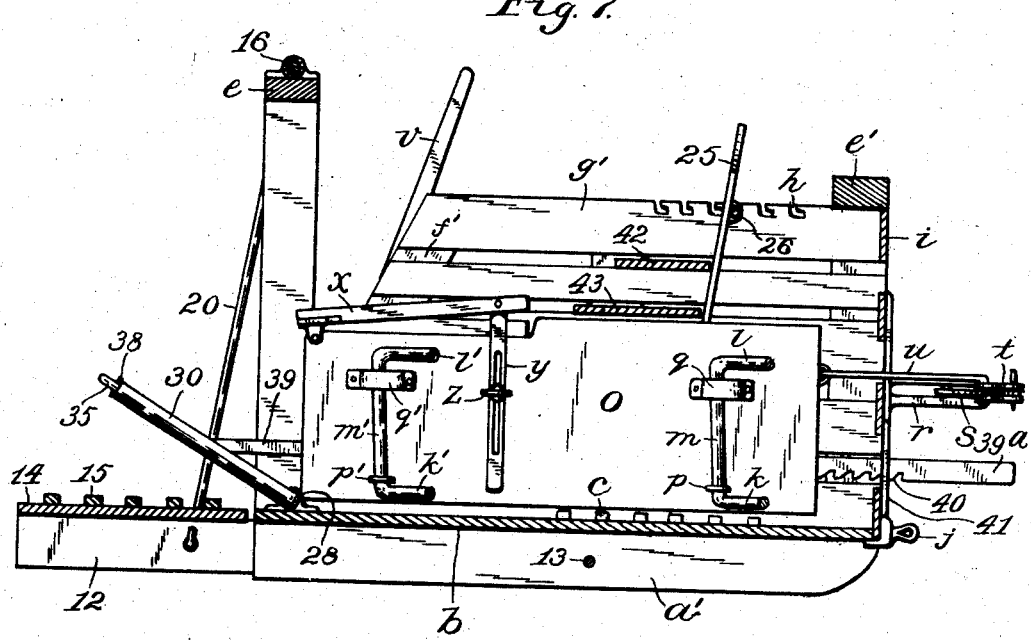

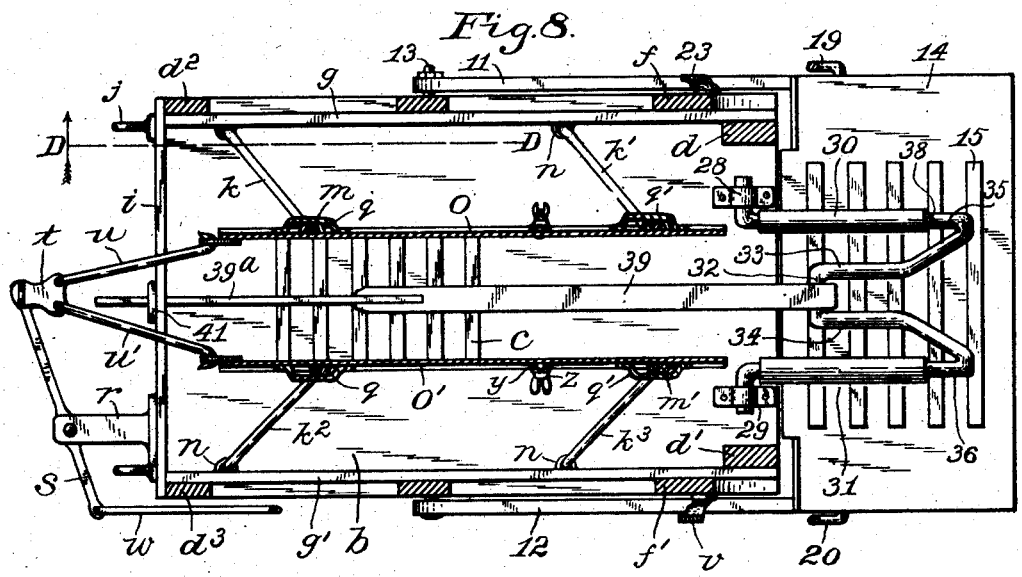

UNITED STATES PATENT OFFICE.

HARVEY M. SMITH, OF MONROE TOWNSHIP, MORGAN COUNTY, INDIANA.

BREEDING-CAGE.

No. 866,396.      Specification of Letters Patent.      Patented Sept. 17, 1907.

Application filed April 4, 1907. Serial No. 366,269.

*To all whom it may concern:*

Be it known that I, HARVEY M. SMITH, a citizen of the United States, residing in Monroe township, in the county of Morgan and State of Indiana, have invented certain new and useful Improvements in Breeding-Cages; and I do declare the following to be a full, clear, and exact description of the invention, reference being had to the accompanying drawings, and to the letters and figures of reference marked thereon, which form a part of this specification.

This invention relates to cages for the use of breeders of fine stock, such as swine, and it has reference particularly to portable cages of this character that are adapted to be adjusted to the requirements for breeding between different sizes of animals.

Objects of the invention are to provide an adjustable breeding cage adapted to be used by stock breeders in order to facilitate the crossing of breeds of different sizes, or when breeding between relatively large and small animals; and to provide a convenient and durable portable breeding cage.

With the above-mentioned and minor objects in view the invention consists in a breeding cage comprising certain novel features of construction, in certain novel elements in breeding cages, and in the parts and combinations and arrangements of parts, as hereinafter particularly described and defined in the claims appended hereto.

Figure 1:
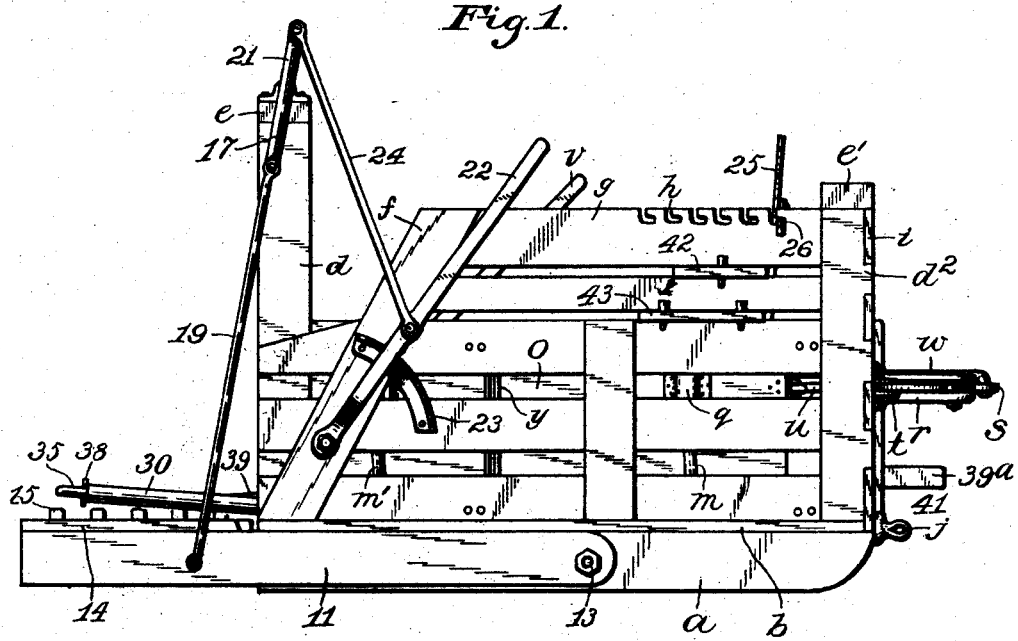
Figure 2:
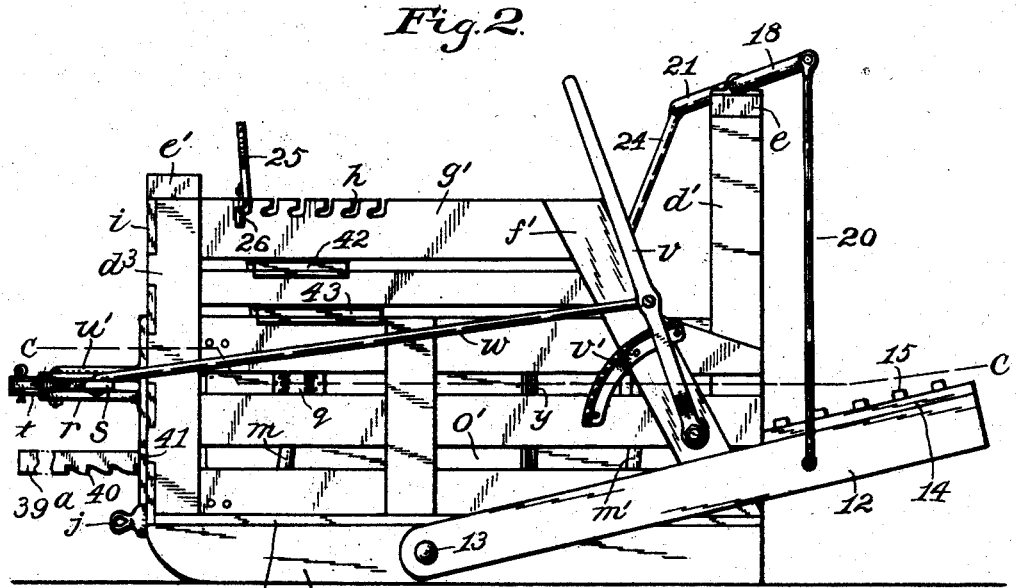

Referring to the drawings, Figure 1 is a right-hand side elevation of a breeding cage constructed substantially in accordance with the invention; Fig. 2, a left-hand side elevation thereof; Fig. 3, a top plan; Fig. 4, a rear end elevation; Fig. 5, a front end elevation; Fig. 6, a longitudinal vertical sectional view approximately on the line A A in Fig. 4; Fig. 7, a longitudinal vertical sectional view approximately on the line B B in Fig. 5; Fig. 8, a fragmentary horizontal sectional view approximately on the line C C in Fig. 2; Fig. 9, a fragmentary vertical sectional view approximately on the line D D in Fig. 8; and, Fig. 10, a sectional elevation of the gate of the cage.

Similar reference characters in the different figures of the drawings designate corresponding elements or features of construction.

Practically embodied, the invention comprises a frame-work having side-sills formed as sled-runners $a$ and $a'$ on which a floor $b$ is attached, a suitable number of cleats $c$ being secured to the top of the floor near the forward middle portion thereof, thus providing a portable platform on which are erected four corner posts $d$ $d'$ $d^2$ $d^3$, a cross-beam $e$ being attached to the tops of the posts $d$ and $d'$, and a cross-beam $e'$ on the posts $d^2$ and $d^3$. Angle-braces $f$ and $f'$ extend from the floor at the rear posts $d$ and $d'$ upwardly and forwardly, the braces supplementing the posts and a suitable number of side boards $g$ and $g'$ are suitably attached to the lower portions of the forward and rear corner posts and the angle-braces at each side of the frame; other boards being shorter and attached only to the upper portions of the forward posts $d^2$ and $d^3$ and to the angle-braces above the longer boards, so that working spaces for attendants are provided in the sides of the framework at the rear portions thereof between the upper portions of the angle-braces and the rear posts $d$ and $d'$. The side boards are spaced suitable distances apart, and the uppermost board on each side has a suitable number of undercut notches $h$ formed in the upper edge near the forward end thereof. A suitable number of end boards $i$ are attached to the forward posts $d^2$ and $d^3$. Draft eyes $j$ are provided at the fronts of the runners for drawing the cage from place to place as a sled on the ground.

For holding the brood animal in proper position within the framework, suitable mechanism and guards are provided comprising four arms $k$ $k'$ $k^2$ $k^3$ and four longer arms $l$ $l'$ $l^2$ $l^3$ in pairs, each pair comprising a longer and a shorter arm connected together by a pivot-rod $m$ or $m'$, all formed integrally, and each one of the shorter arms has its free end supported pivotally in a bearing $n$ that is attached to a side-board near the floor $b$, each longer arm being connected pivotally to a bearing $n'$ that is attached to a side-board somewhat above the bearing $n$, so that each pivot-rod $m$ is inclined to the perpendicular. A pair of the arms are mounted on each side, a pair being near either end thereof. A pair of side boards $o$ and $o'$ comprise parts of the guards, and each board has a pair of bearings $p$ and $p'$ attached to the lower portion thereof that are connected to the pivot-rods $m$ and $m'$, and above the bearings a pair of guides $q$ and $q'$ are attached to the board so as to embrace the pivot-rods while permitting the pivot-rods to move in the guides which hold the board close to the pivot-rods. It will be seen therefore that the side boards $o$ and $o'$ are opposed one to the other, and are inclined somewhat, the tops of the boards being closer together than their bottoms, and that the boards may move longitudinally, swinging on their supports above-described, each to or from the other, clear of the floor $b$.

For adjusting the boards and holding them in the desired positions, a bracket $r$ is mounted on front end boards $i$ and pivotally supports a lever $s$ between its ends, one end of the lever being connected to a coupling $t$ to which are pivoted two connecting rods $u$ and $u'$ which are connected to the boards $o$ and $o'$ respectively. A controlling lever $v$ is pivoted at one end thereof to the brace $f'$ and is normally latched to a quadrant $v'$ suitably supported, a reach-rod $w$ being connected to the lever $v$ and to the other end of the lever $s$ which extends outwardly beyond the left-hand side of the frame. The side boards $o$ and $o'$ are provided with adjustable foot rests $x$ and $x'$, each one of which is pivoted at an end thereof to the rear upper corner of the board, the other end of each rest having a prop $y$ connected thereto that is attached adjustably to the side board by a binding screw $z$, so that the foot rests may be adjusted vertically, as occasion may require, whereby to support the forward portion of a relatively heavy sire and thereby relieve the dam of overburden. The boards $o$ and $o'$ may be brought close to the sides of the dam by operating the lever $v$.

A vertically-adjustable platform for the sire is provided at the rear of the cage, and it comprises a pair of sills 11 and 12 which are pivoted to the outer sides of the sills or runners $a$ and $a'$ by a pivot 13, and a floor 14 on top of the free end portions of the pivoted sills, the top of the floor having cleats 15 secured thereto.

A rock-shaft 16 is journaled upon the beam $e$ and has two crank-arms 17 and 18 at its ends to which links 19 and 20 are connected for lifting and adjusting the platform, the links being connected to the pivoted sills thereof. The rock-shaft has also a crank-arm 21 for its operation and control.

An operating lever 22 is pivoted to the brace $f$ and is normally latched to a quadrant 23, the lever being connected by a rod 24 with the arm 21.

A head-board 25 is provided with a cross-bar 26 that is adapted to be placed into notches $h$ for holding the head-board adjustably in any suitable position, the lower or foot end of the head-board having a slot 27 therein and resting normally on the floor $b$ against a cleat $c$ between the side-boards $o$ and $o'$, for varying the length of the space between the side-boards.

A gate is provided at the rear end of the cage, and it is adapted to drop and lie upon the floor cleats 15, the gate comprising a pair of pivot-bearings 28 and 29 that are secured to the floor $b$, and two hollow members 30 and 31 that are connected pivotally to the two pivot-bearings respectively; also, a gate-frame that has a pivot-bar 32 which is connected by two bars 33 and 34 that are connected to side-bars 35 and 36 respectively, all preferably formed integrally of metal, the side-bars 35 and 36 being parallel one to the other and adjustable longitudinally in the members 30 and 31 and supported by pintles 38 inserted in holes 37 in the side-bars on the tops of the hollow members. The gate may be held either upright or inclined and is substantially M-shape when upright, the pivot-bar 32 being midway between the posts $d$ and $d'$. A pole 39 has one end connected pivotally to the pivot-bar 32 and has a rack-bar $39^a$ attached to its other end which is provided with ratchet-teeth 40 adapted to engage a catch-plate 41 which is secured to front end boards $i$, the pole extending midway between the side-boards $o$ and $o'$ and being adapted to hold the gate uprightly. The pole is intended also to prevent a frightened animal from sitting on the floor $b$.

In order to prevent a frightened animal from jumping up against the head-board 25, a pair of cover-boards 42 and 43 are provided which are mounted slidingly between side-boards $g$ and $g'$ and may be moved adjustably to various positions above the side-boards $o$ and $o'$, either one or both being used, as may be required.

In practical use, when it is desired to transport the cage, the rear platform may be elevated as in Fig. 2, to clear the ground, and the platform may be elevated more or less when the sire is standing thereon. After the dam walks upon the floor $b$ the side-boards $o$ and $o'$ are to be adjusted, after which the gate and the head-board are to be adjusted. The operations of other elements will be understood from the foregoing description of construction.

Having thus described the invention, what is claimed as new is—

1. A breeding cage including a framework, a pair of side boards provided each with two pairs of supporting arms pivoted thereto and also to the framework, and means for moving the side-boards longitudinally for adjusting them each towards or from the other.

2. A breeding cage including a framework, a head-board supported adjustably in the framework, a gate pivoted opposite to the head-board and swinging vertically, means for connecting the gate with the framework in adjusted positions, and a platform mounted adjustably on the framework adjacent to the gate.

3. A breeding cage including a framework having four pairs of arms mounted pivotally on the inner sides thereof, two pairs swinging towards or from the remaining two pairs of the arms, each two pairs comprising lower arms and relatively longer upper arms, and a pair of side-boards within the framework, each pivoted to two pairs of the arms and having a foot-board mounted adjustably on an upper portion thereof.

4. A breeding cage including a framework, a pair of side-boards mounted in the framework and adjustable each towards or from the other, means for adjusting and holding the side-boards, a head-board mounted adjustably in the framework between the side-boards, and a gate supported by the framework opposite to the head-board.

5. A breeding cage including a framework, a pair of side-boards mounted in the framework and adjustable each towards or from the other, means for adjusting and holding the side-boards, a head-board mounted adjustably in the framework between the side-boards, a gate supported by the framework opposite to the head-board, and a cover board mounted in the framework above the side-boards and adjustable between the head-board and the gate.

6. A breeding cage including a framework having a pair of side-boards mounted therein, each side-board being adjustable towards or from the other, means for adjusting and holding the side-boards, a gate mounted on the framework at an end thereof, a pole connected to the gate pivotally and extending between the side-boards to the opposite end of the framework, and means for latching the pole to the framework in adjustable positions and thereby adjustably holding the gate.

7. A breeding cage including a framework having a pair of sills and also inclosing sides; an adjustable platform at ends of the sills and pivotally connected thereto, a rock-shaft having crank-arms and mounted on the framework, links connected to the crank-arms and to the platform, means for adjusting the rock-shaft rotatively, a gate mounted pivotally on the framework adjacent to the platform, a head-board mounted in the framework between the sides thereof and adjustable towards or from the gate, and means for holding the gate adjustably.

8. A breeding cage including a framework having sides provided with notches and having also a floor on which are cleats, a gate mounted in the framework, a vertically-adjustable platform mounted on the framework near the gate, a head-board resting adjustably on the floor between cleats thereof and having an opening therein and also provided with a supporting bar adjustably mounted on the sides in notches thereof, and a vertically-adjustable pole extending between the sides of the framework through the opening in the head-board and provided with latching devices.

9. A breeding cage including a framework having a pair of sills, a vertically-adjustable platform at ends of the sills and pivoted thereto, means for adjusting and holding the platform, a gate pivoted on the framework and movable either to upright positions or down onto the platform and provided with an extensible part, a pole connected pivotally to the gate and provided with a rack-bar having teeth, a fixed catch-plate to be engaged by the teeth for adjusting the pole and the gate, and a head-board mounted adjustably in the framework opposite to the gate.

10. A breeding cage including a framework having sled-runners, a platform mounted at ends of the runners and adjustable vertically, two side-boards mounted in the framework and adjustable each towards or from the other and inclined with their tops towards each other, a lever pivotally supported by the framework, rods connecting the lever with the side-boards, a controlling lever mounted on the framework and operatively connected with the other lever, a rock-shaft mounted on the framework and operatively connected with the platform, a controlling lever mounted on the framework and operatively connected with the rock-shaft, a gate mounted near the platform, and a head-board mounted in the framework and adjustable towards or from the gate.

In testimony whereof, I affix my signature in presence of two witnesses.

HARVEY M. SMITH.

Witnesses:
E. T. SILVIUS,
J. H. GARDNER.